(12) United States Patent
Kakulamarri et al.

(10) Patent No.: US 8,533,682 B2
(45) Date of Patent: Sep. 10, 2013

(54) AMPLIFICATION OF DYNAMIC CHECKS THROUGH CONCURRENCY FUZZING

(75) Inventors: Laxmi Narsimha Rao Kakulamarri, Redmond, WA (US); Madanlal S. Musuvathi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 251 days.

(21) Appl. No.: 12/940,983

(22) Filed: Nov. 5, 2010

(65) Prior Publication Data

US 2012/0117544 A1 May 10, 2012

(51) Int. Cl.
- G06F 9/44 (2006.01)
- G06F 11/30 (2006.01)
- G06F 11/00 (2006.01)
- G06F 3/00 (2006.01)
- G06F 9/46 (2006.01)
- H04L 29/06 (2006.01)

(52) U.S. Cl.
USPC ........... 717/126; 717/127; 702/186; 713/164; 714/2; 715/740; 718/103; 726/24

(58) Field of Classification Search
None
See application file for complete search history.

(56) References Cited

U.S. PATENT DOCUMENTS

| | | | |
|---|---|---|---|
| 6,009,269 A | | 12/1999 | Burrows et al. |
| 6,594,774 B1 * | | 7/2003 | Chapman et al. .................. 714/2 |
| 7,401,208 B2 | | 7/2008 | Kalla et al. |
| 2002/0122062 A1 * | | 9/2002 | Melamed et al. ............. 345/763 |
| 2005/0065753 A1 * | | 3/2005 | Bigus et al. ................... 702/186 |
| 2005/0165735 A1 * | | 7/2005 | Lin et al. ............................ 707/2 |
| 2006/0282456 A1 * | | 12/2006 | Kapoor et al. ................ 707/102 |
| 2007/0022287 A1 * | | 1/2007 | Beck et al. ..................... 713/164 |
| 2007/0209032 A1 | | 9/2007 | Mihai et al. |
| 2007/0220492 A1 | | 9/2007 | Brugiolo et al. |
| 2008/0028469 A1 * | | 1/2008 | Repasi et al. ................... 726/24 |
| 2008/0301647 A1 * | | 12/2008 | Neystadt et al. .............. 717/127 |
| 2009/0094524 A1 * | | 4/2009 | Abbott et al. ................. 715/740 |
| 2009/0113439 A1 * | | 4/2009 | Zettler et al. ................. 718/103 |

OTHER PUBLICATIONS

Jared DeMott, The Evolving Art of Fuzzing, Jun. 1, 2006, [Retrieved on Aug. 27, 2012]. Retrieved from the internet: <URL:http://vdalabs.com/tools/The_Evolving_Art_of_Fuzzing.pdf> 25 Pages (1-25).*

Klaus Havelund et al., Benchmark and Framework for Encouraging Research on Multi-Threaded Testing Tools, 2003 IEEE, [Retrieved on Apr. 18, 2013]. Retrieved from the internet: <URL:http://ieeexplore.ieee.org/stamp/stamp.jsp?tp=&arnumber=1213510 > 8 Pages (1-8).*

Burckhardt, et al. "A Randomized Scheduler with Probabilistic Guarantees of Finding Bugs", ASPLOS 2010, Mar. 13-17, 2010, Pittsburgh, Pennsylvania, 12 pages.

(Continued)

Primary Examiner — Don Wong
Assistant Examiner — Anibal Rivera
(74) Attorney, Agent, or Firm — Gonzalez Saggio & Harlan LLP

(57) ABSTRACT

The subject disclosure relates to effective dynamic monitoring of an application executing in a computing system by increasing concurrency coverage. A set of dynamic checks are linked to an application by mechanisms that enable the dynamic checks to monitor behavior of the application at runtime. As additionally described herein, concurrency fuzzing is applied to the application to randomize thread schedules of the application, thus increasing a number of disparate concurrency scenarios of the application observed by the plurality of dynamic checks.

16 Claims, 11 Drawing Sheets

(56) References Cited

OTHER PUBLICATIONS

Burckhardt, et al. "Concurrency Software Testing with Probabilistic Bounds on Finding Bugs", U.S. unpublished U.S. Appl. No. 12/628,223, filed Dec. 1, 2009, 36 pages.

Sen. "Race directed random testing of concurrent programs"—PLDI'08, Jun. 7-13, 2008, Tucson, Arizona. Available online at: [http://portal.acm.org/citation.cfm?id=1375584&dl=GUIDE&coll=GUIDE&CFID=97979640&CFTOKEN=95815625], 11 pages.

Sen. "Effective random testing of concurrent programs"—ASE'07, Nov. 5-9, 2007, Atlanta, Georgia. Available online at [http://portal.acm.org/citation.cfm?id=1321679], 10 pages.

Musuvathi, et al. "Concurrency Fuzzing with Cuzz Microsoft Research Tool"—Webcast, Jul. 16, 2010. Published online at diTii.com—D' Technology Weblog: [http:ditii.com/2010/07/16/concurrency-fuzzing-with-cuzz-microsoft-research-tool-webcast/], 8 pages.

Ball, et al. "First-class Concurrency Testing and Debugging"—Available online at: [http://research.microsoft.com/en-us/projects/chess/ec2-submission.pdf[, retrieved on Aug. 13, 2010, 4 pages.

* cited by examiner

AMPLIFICATION OF DYNAMIC CHECKS THROUGH CONCURRENCY FUZZING

BACKGROUND

Some software programs can exhibit programming errors or bugs, which can be difficult to identify with normal application testing. For example, employing a debugger can facilitate identifying many programming code errors. However, subtle errors, caused by heap corruptions, incorrect handle usage, critical section usage, etc., can escape detection. In addition, such errors can occur at locations remote from a root cause. For instance, a heap corruption can occur at a first point of program code, but not manifest (e.g., crash the program) until a second point of the program code executed later than the first point. An application verification tool can be employed to identify such errors.

Another class of programming errors includes concurrency bugs. Concurrency bugs arise from a concurrent nature of concurrent programs. A concurrent program includes one or more threads of control (hereinafter referred to as "threads"). The threads can relate to processes, threads within a process, processors in computer hardware, processing cores of a processor, and/or nodes in a distributed system. Concurrency bugs, in general, occur when instructions of a concurrent program execute or are scheduled to execute in an order not envisioned by a programmer. Accordingly, concurrency bugs can manifest on particular thread schedules among an exponential number of possible thread schedules. Concurrency testing typically involves identifying a buggy schedule in which concurrency bugs appear. One technique, to uncover concurrency bugs, is to stress test a concurrent program. Stress testing typically involves running the concurrent program for days, or even weeks, under heavy loads in the hope that thread schedule that uncovers a bug is discovered.

Concurrency bugs such as, but not limited to, ordering errors, atomicity violations, deadlocks, or the like, which are targets of conventional concurrency testing, are not the only bugs which can manifest in only a subset of possible thread schedules. For instance, memory corruptions, incorrect handle usages, critical section concerns, etc., can appear in particular thread schedules. The application verification tool can fail to detect errors tied to particular thread schedules without stress testing and, even with stress testing, inefficiently uncovers such errors.

The above-described deficiencies of today's application testing systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one or more embodiments, a concurrent nature of programs is leveraged to increase a likelihood of identifying programming errors or bugs. Various techniques are provided herein which can facilitate testing of an application in a robust and efficient manner to facilitate discovery of subtle errors. Accordingly, techniques for testing applications as provided herein afford greater accuracy and coverage over conventional testing techniques. Further, concurrency of an application is controlled to enable a probabilistic guarantee of finding a particular bug, if the bug exists.

In some embodiments, a plurality of dynamic checks can be associated with an application undergoing testing. The dynamic checks can monitor execution of the application to identify programming errors. In addition, concurrency fuzzing is employed to randomize thread execution order, in a disciplined manner, to maximize a likelihood of the dynamic checks identifying subtle errors.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
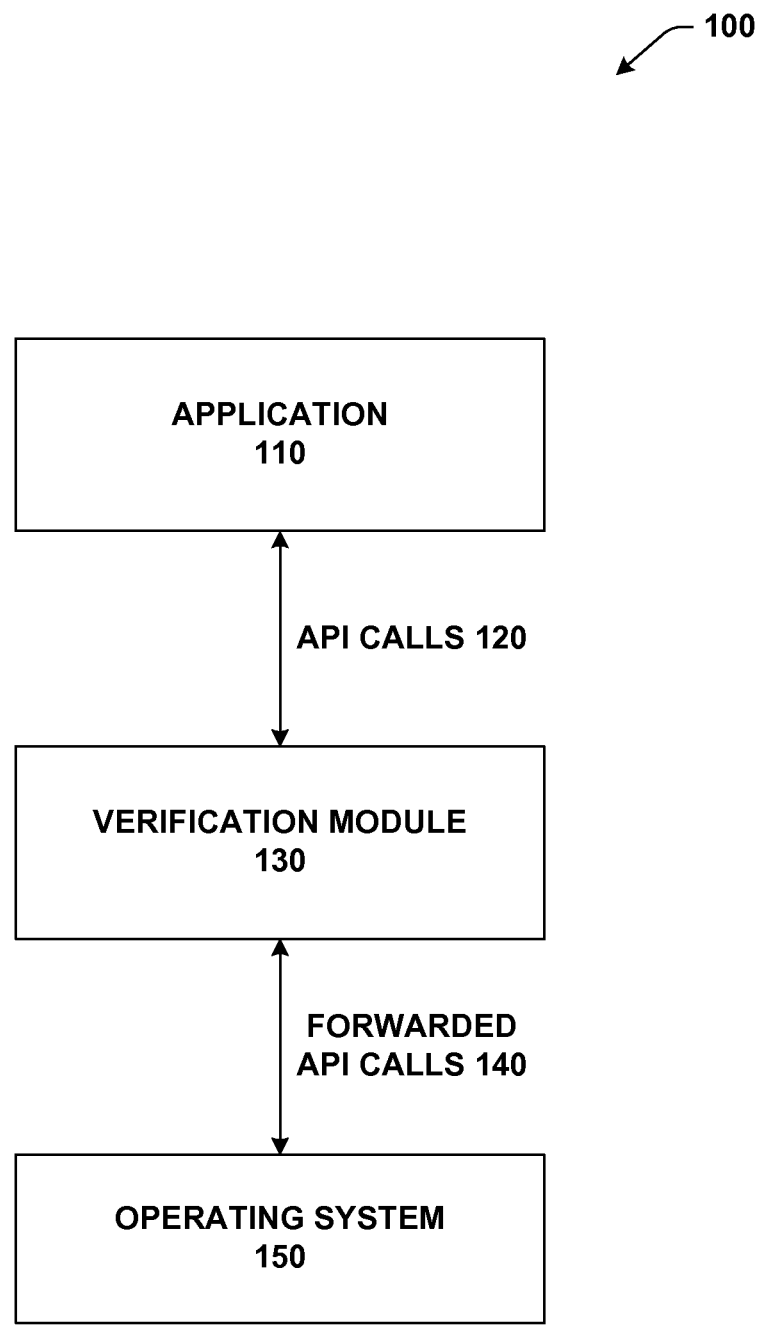
FIG. 1 is a block diagram showing a simplified view of a computing system in accordance with one or more embodiments.

By way of introduction, an application comprising computer-executable program code can be designed to concurrently implement various functions. Conventionally, a concurrent application is designed to create and utilize a plurality of threads, wherein each thread includes a portion of the computer-executable program code included in the application. An operating system of a computing system can schedule threads to execute on a processing core, or, in the case of a multiple core computing system, schedule threads to execute concurrently on multiple processing cores.

However, while various mechanisms for testing applications exist, these mechanisms do not reliably identify subtle programming errors, which manifest due to interactions among threads. For example, threads can execute in one order among an exponential number of potential orders and certain bugs can manifest in only a subset of the exponential number of possible orders. Thus, it can be appreciated that certain bugs can remain undetected despite thorough testing efforts.

Conventionally, stress testing an application (e.g., executing the application a large number of times) can discover some subtle bugs. However, stress testing alone cannot guarantee that a particular thread schedule will occur. Accordingly, stress testing often leaves bugs unidentified.

Other conventional techniques enable thread schedules to be randomized in order to facilitate more efficient identification of bugs tied to particular schedules. However, such techniques, while capable of randomizing concurrency scenarios of applications, do not provide additional checks that facilitate identification of root causes of problems. For instance, conventional mechanisms that provide randomized thread schedules to induce a buggy thread schedule typically result in an application crash. However, such mechanisms do not offer additional guidance, beyond a typical core dump, to find the underlying cause of the buggy thread schedule.

In an embodiment, the above-noted shortcomings of conventional testing techniques are mitigated by employing robust dynamic monitoring of applications while introducing concurrency fuzzing to maximize concurrency coverage. At an abstract level, various embodiments herein provide dynamic checks of an application to identify and/or facilitate identification of programming errors leading to errors in the application. For instance, behavior of the application can be closely monitored to discover incorrect utilization of functions. In addition, thread schedules can be randomized to increase coverage of the dynamic checks across a variety of concurrency scenarios. In various embodiments, a guarantee that a particular thread schedule will occur with a given probability can be provided. Accordingly, in contrast with stress testing where there is no guarantee of finding a particular bug tied to a particular schedule, various embodiments herein provide a maximum likelihood that the dynamic checks identify bugs tied to a subset of thread schedules.

In one embodiment a system as described herein includes one or more dynamic monitors respectively configured to detect program errors of an application during runtime and a concurrency fuzzing module configured to randomize a thread schedule associated with the application to enable the one or more dynamic monitors to check the application in a variety of concurrency scenarios. Additionally, the concurrency fuzzing module randomizes the thread schedule to increase a likelihood of the one or more dynamic monitors detecting program errors.

In some examples, the one or more dynamic monitors include at least one of a memory monitor, a handle monitor, a thread pool, monitor, a synchronization monitor, a locks monitor, a critical section monitor, an I/O monitor, a print monitor, an exceptions monitor, a networking monitor, a low resource simulation monitor, a thread local storage monitor, an application hang monitor, a remote procedure call monitor, a component object model monitor, a service control manager monitor, or an application compatibility monitor. In another example, the one or more dynamic monitors are further configured to intercept application program interface (API) calls of the application, to collect information regarding a state of the application from intercepted API calls, and to forward API calls to an operating system, wherein forwarded API calls comprise modified versions of API calls from the application.

The system, in another example, further includes a verification framework configured to provide an extensible environment to dynamically monitor executing applications. The verification framework dynamically loads the one or more dynamic monitors and the concurrency fuzzing module at runtime.

In further examples, the system can include an engine module that associates the one or more dynamic monitors with the application. For instance, the engine module can be further configured to hook APIs employed by the application by modifying an import access table of the application to redirect API calls to the one or more dynamic monitors. Additionally or alternatively, the engine module can be configured to chain two or more dynamic monitors from a single API.

The system, in some cases, can include a log module configured to retain information generated by the one or more dynamic monitors. In another example, the one or more dynamic monitors can be further configured to launch a debugger upon detection of a program error.

In still another example, the concurrency fuzzing module can be configured to hook APIs employed by the application, wherein the APIs are thread-related APIs. In such an embodiment, the concurrency fuzzing module inserts delays in one or more threads associated with the application to randomize the thread schedule. For instance, the concurrency fuzzing module can be configured to assign initial priorities to one or more threads associated with the application, and to select priority change points in the application, where each priority change point is respectively associated with a priority value. Additionally or alternatively, the concurrency fuzzing module can be configured to schedule one or more threads of the application to run at a particular time.

In another embodiment, a method is provided that includes intercepting APIs employed by an application, analyzing API utilization of the application to identify errors of the application including analyzing the set of APIs, and inserting delays into one or more threads of the application to selectively randomize thread schedules. In an example, hooking can be conducted by modifying entries of an import address table of the application to redirect the APIs.

In an additional embodiment, a system can include a verification framework configured to attach to an application during runtime, the verification framework loads at least one dynamic check from a set of available checks and a concurrency fuzzing module. In an example, the verification framework can associate at least one dynamic check and the concurrency fuzzing module with one or more APIs of an operating system employed by the application. In another example, at least one dynamic check analyzes application behavior via APIs calls to identify errors. Additionally, the concurrency fuzzing module can insert delays into one or more threads of the application to randomize an order in which instructions of the one more threads execute.

In a further example, at least one dynamic check and the concurrency fuzzing module are further configured to avoid utilizing APIs of the operating system. Additionally, the concurrency fuzzing module is further configured to implement priority-based thread scheduling independent of scheduling mechanisms provided by the operating system.

Herein, an overview of some of the embodiments for providing robust dynamic monitoring of an application across a variety of concurrency scenarios has been presented above. As a roadmap for what follows next, various exemplary, non-limiting embodiments and features for runtime checks on an application are described in more detail. Then, some non-limiting implementations and examples are given for additional illustration, followed by representative network and computing environments in which such embodiments and/or features can be implemented.

Dynamic Checks with Concurrency Fuzzing

With respect to one or more non-limiting ways to extensively test applications as described above, a block diagram of an exemplary computing system 100 is illustrated generally by FIG. 1. Computing system 100 includes an application 110, which includes programming code that, when executed, generates application program interface (API) calls 120. Further, an operating system 150 can be provided within computing system 100 to manage hardware components (e.g., input devices, output devices, memory devices, storage devices, processing devices, etc.) of computing system 100 and provide common services (e.g., runtime libraries, etc.) to programs executed on computing system 100, such as application 110. For instance, operating system 150 can include a plurality of modules extending common functionality via a plurality of APIs. Operating system 150 can receive a call to an API, execute a function or module associated therewith, and return a result to an entity initiating the call.

As further shown in FIG. 1, a verification module 130 intercepts the API calls 120 from application 110, processes the API calls 120, and generates forwarded API calls 140, which are subsequently provided to operating system 150. As described herein, verification module 130 can include a plurality of dynamic checks or monitors that respectively monitor application 110 during execution. In an embodiment, computing system 100 enables dynamic runtime monitoring of application 110 without modification of application 110 by a programmer.

Figure 2:
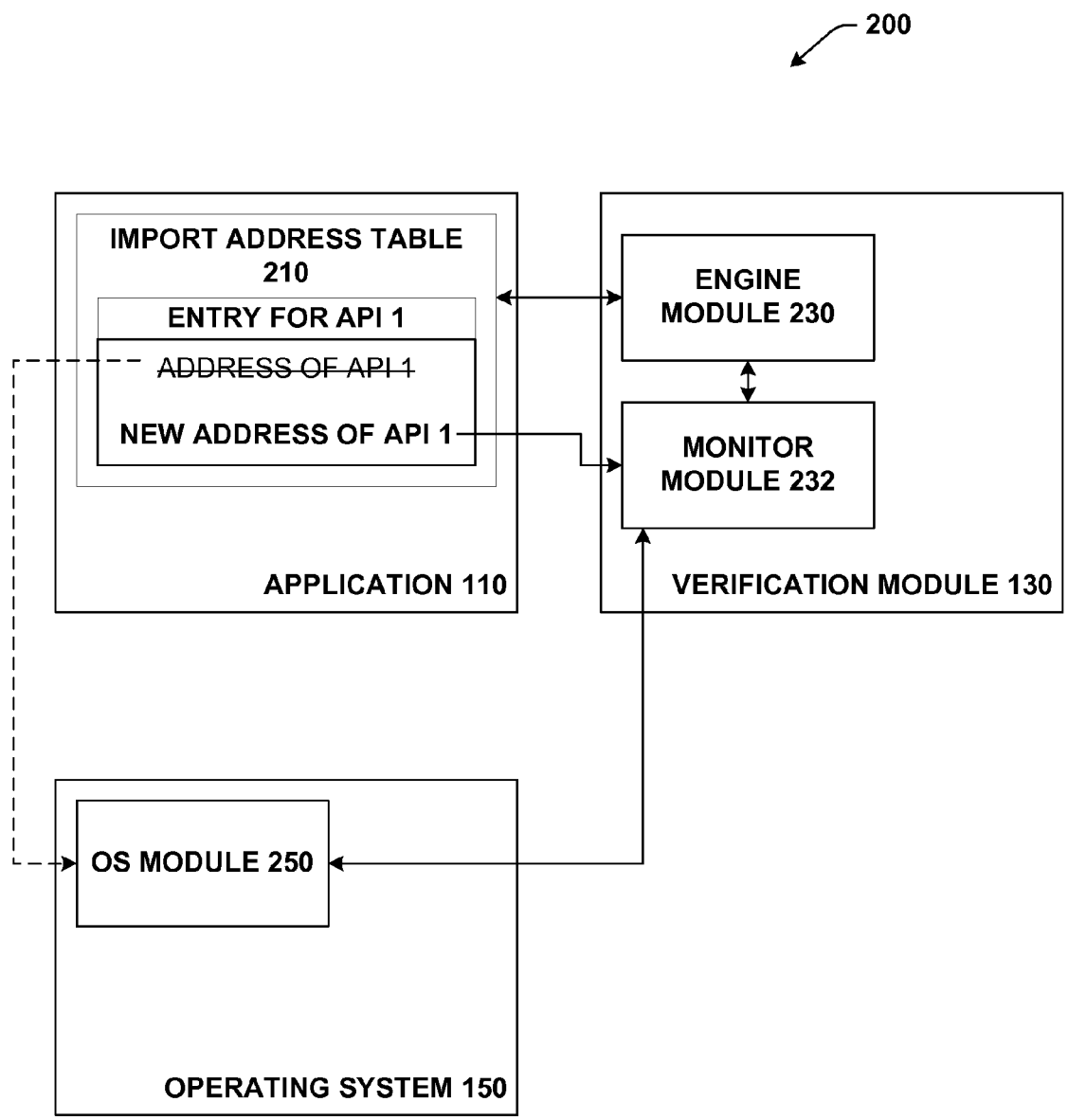
FIG. 2 is a block diagram showing an illustrative overview of API hooking in accordance with one or more embodiment.

For example, as shown by block diagram 200 in FIG. 2, verification module 130 can include a monitor module 232 configured to implement at least one type of check. For instance, monitor module 232 can check, at runtime, memory usage, handle usage, critical section usage, thread usage, asynchronous input/output, or the like. Verification module 130 can include a plurality of disparate monitor or check modules pluggable into verification module 130 in a standardized manner. Programmers can develop additional checks and load the checks into verification module 130 to monitor various aspects of applications.

To check an aspect, monitor module 232 monitors one or more APIs employed by application 110. Upon loading monitor module 232, e.g., as a plug-in, monitor module 232 can register with an engine module 230 configured to associate monitor module 232 with application 110. Monitor module 232 can inform engine module 230 of one or more APIs to be monitored and engine module 230 can dynamically hook the one or more APIs of operating system 150 employed by application 110. In an embodiment, engine module 230 can modify an import address table 210 of application 110 to redirect API calls from operating system 150 to verification module 130. More particularly, suppose monitor module 232 is configured to hook API 1 employed by application 110. Engine module 230 accesses an entry for API 1 in import address table 210 and replaces an address of API 1 corresponding to OS module 250 (indicated by the dashed line in FIG. 2), which implements API 1, with a new address of API 1 corresponding to monitor module 232 (indicated by the solid line in FIG. 2). When application 110 calls API 1, the call redirects from OS module 250 to monitor module 232.

Monitor module 232 can perform various pre-processing and/or post-process sing to ascertain a state of application 110. For instance, monitor module 232 can verify that preconditions of API 1 are met. In addition, monitor modulate 232 can verify accuracy and/or integrity of parameters passed with the call to API 1. After pre-processing, monitor module 232 can forward the API call to OS module 250. For instance, monitor module 232 can call the actual API 1 on behalf of application 110. When OS module 250 returns a result, monitor module 232 can perform post-process sing before returning the result to application 110.

Information gained via pre-processing and/or post-processing can indicate programming errors in application 110. Monitor module 232 can detect such errors and initiate corrective action. For instance, monitor module 232 can halt execution of application 110, issue an error message, and provide guidance to facilitate identification of a cause of the error. In addition, monitor module 232 can break into a debugger, if available, at the point of failure to facilitate debugging application 110. When a debugger is not active, monitor module 232 can crash application 110 and acquire a dump file. Further, monitor module 232 can log pre-processing and post-processing information, error information, guidance information, etc., to a log file.

Figure 3:
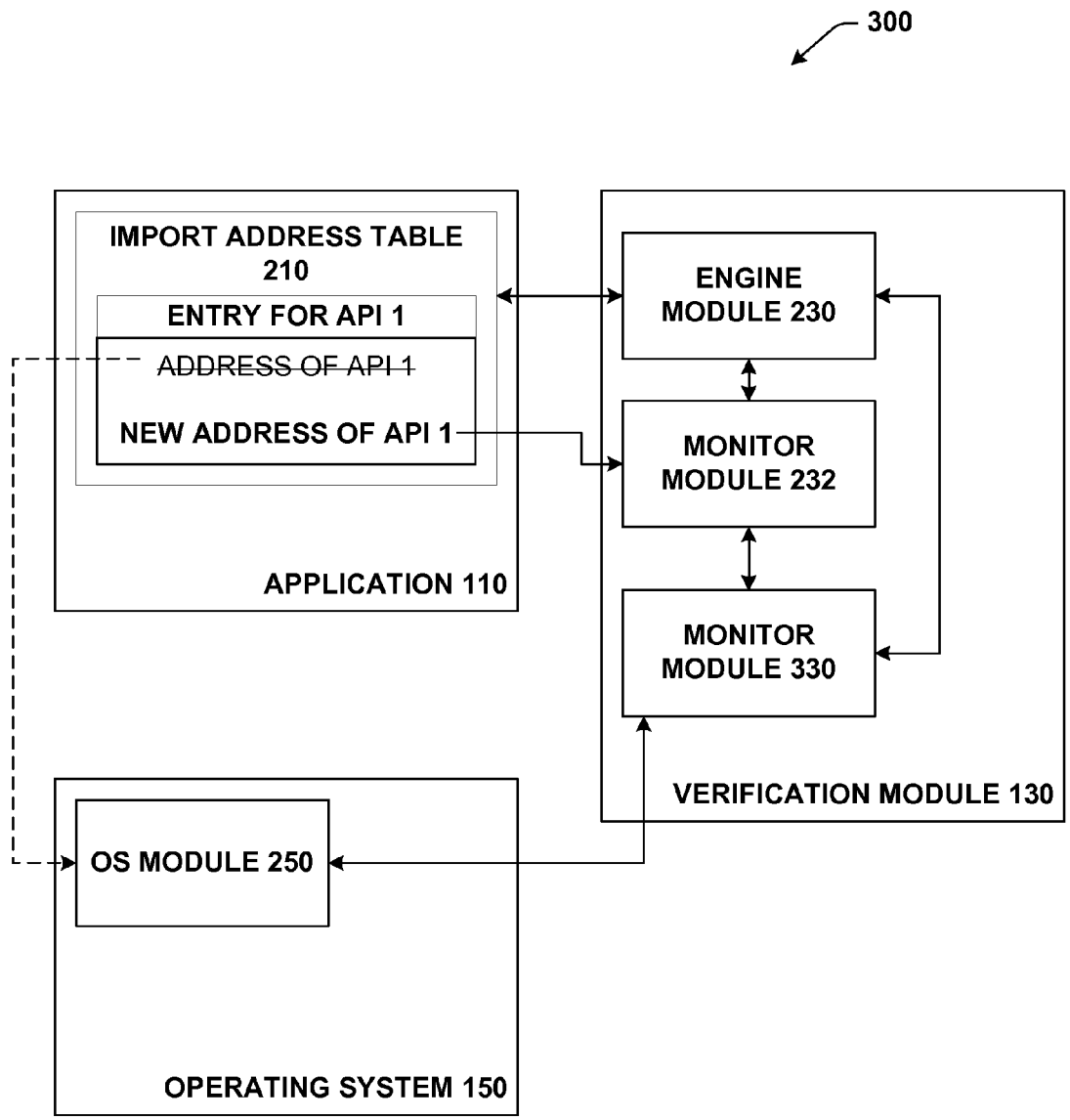
FIG. 3 is a block diagram showing an illustrative overview of API hooking in accordance with one or more embodiment.

Illustrating one or more additional aspects, FIG. 3 is a block diagram 300 showing multiple monitor modules monitoring a single API. In one embodiment, engine module 230 can associate monitor module 232 with application 110 as described above with respect to FIG. 2. Subsequently, a new module, e.g., monitor module 330, can be loaded into verification module 130. Monitor module 330 can be configured to provide a disparate dynamic check to monitor module 232 but hook at least one identical API as monitor module 232. Engine module 230, when monitor module 330 registers, can identify that API 1 is previously associated with monitor module 232. Instead of overwriting import address table 210 of application 110 and, thereby, disassociating monitor module 232, engine module 230 modifies monitor module 232 to forward to monitor module 330. Thus, after monitor module 232 performs various pre-processing tasks, monitor module 232 forwards to monitor module 330. Monitor module 330, in turn, performs respective pre-processing before forwarding the API call to OS module 250.

Figure 4:
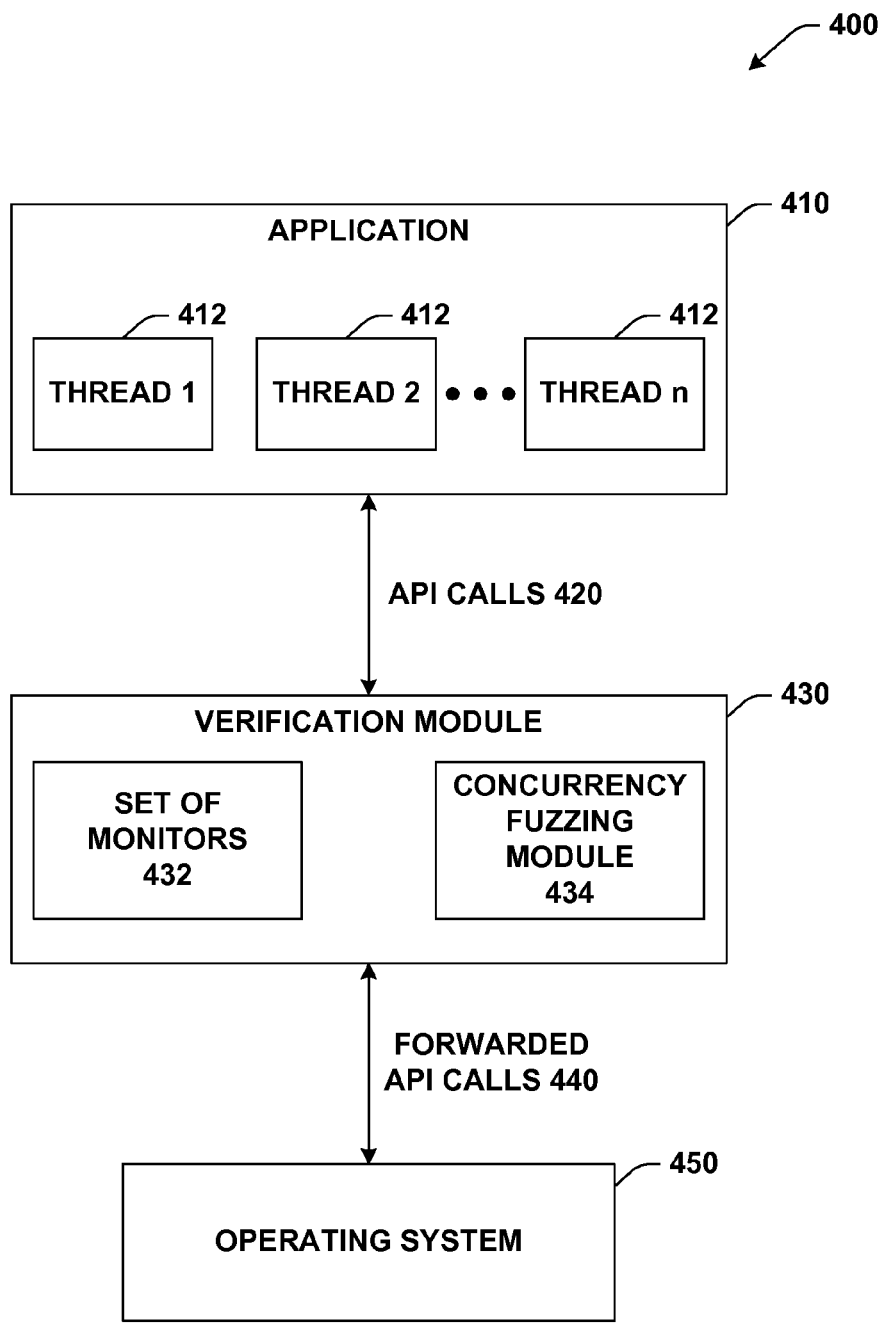
FIG. 4 is a block diagram of an exemplary testing system according to one or more embodiments.

Turning to FIG. 4, a further embodiment is illustrated with a computing system depicted by block diagram 400. As shown in FIG. 4, the computing system can include an application 410 configured to run in connection with an operating system 450 of the computing system. Application 410, according to one or more aspects, can be a user application or portion thereof, a module of operating system 450, a device driver, a portion of kernel code, or any other suitable portion of programming code utilizing APIs provided by operating system 450. Application 410 can include a plurality of threads 412. As shown in FIG. 4, application 410 can include n threads, where n is an integer greater than or equal to one.

Application 410 can be tested, at runtime, by a verification module 430 configured to intercept API calls 420 as described herein, collect information related to a status of application 410, and forward API calls 420 to operating system 450 as forwarded API calls 440. Verification module 430 includes a set of monitors 432 configured to respectively perform dynamic checks on application 410 during execution. For instance, the set of monitors 432 can include monitors that detect memory corruptions, memory misusages, incorrect handle usages, improper critical section usage, improper thread pool usage, file management issues, and the like. Verification module 430 provides a framework by which each monitor of the set of monitors 432 can be independently loaded/unloaded or enabled/disabled to customize the dynamic checks applied to application 410.

Figure 5:
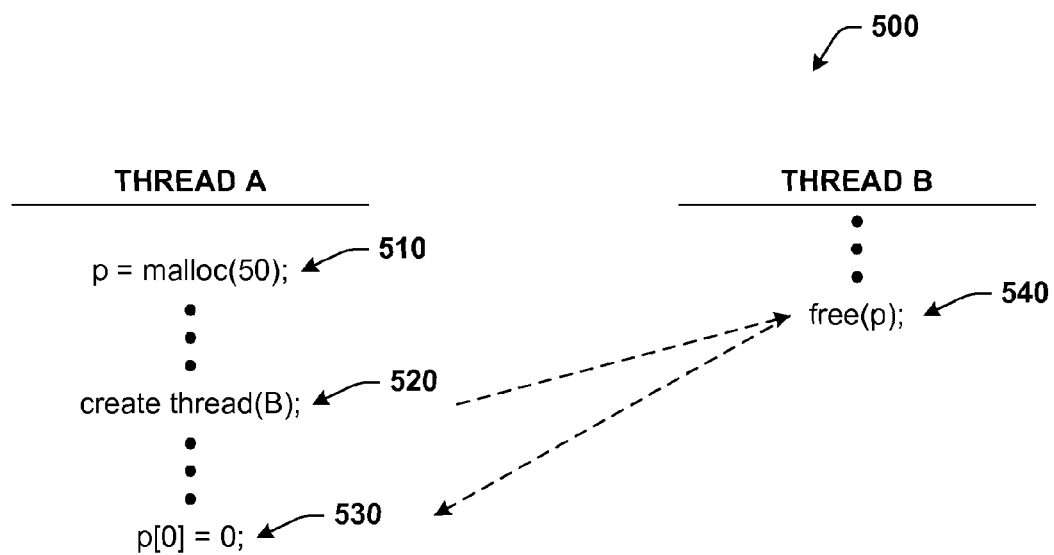
FIG. 5 is an illustrative example of one type of concurrency bug.

The set of monitors 432 can detect subtle errors in application 410 through interception of API calls 420. Such errors can occur in any thread of the plurality of threads 412. In some cases, errors occur due to interactions between threads and/or due to a particular order or schedule of threads. As an illustrative example of one type of error that can occur between threads, diagram 500 in FIG. 5, illustrates a memory corruption bug. As shown in FIG. 5, a first thread, Thread A, can execute a memory allocation at 510. After additional processing, Thread A can create a new thread, Thread B, at step 520. After creation of Thread B, Thread A can execute a code instruction, at step 530, which writes information to the portion of memory allocated by the memory allocation at step 510. Thread B can perform various processing after which Thread B frees the allocated memory space at step 540.

A heap corruption error can occur when the free operation at step 540 occurs prior to the write operation at step 530. However, such ordering of operations may not occur with all thread schedules. Accordingly, even with verification module 430 monitoring application 410, this error can remain undetected.

With reference again to FIG. 4, verification module 430 can include a concurrency fuzzing module 434 configured to maximize a likelihood of discovering errors at runtime, such as the bug described with respect to FIG. 5. For instance, concurrency fuzzing module 434 can randomize thread schedules in a disciplined manner to provide probabilistic guarantees of discovering a bug at a particular depth. Concurrency fuzzing module 434, for example, can insert delays in a random, yet controlled fashion, in threads 412 to modify an order in which instructions in threads 412 execute. The delays are intelligently inserted such that, for a given concurrency bug at a particular depth, a probabilistic bound for finding the bug is specified.

In an embodiment, concurrency fuzzing module 434 is a plug-in of verification module 430 similar to monitors of the set of monitors 432. Upon loading and/or activation, concurrency fuzzing module 434 can register and indicate which APIs employed by application 410 to be hooked. Such APIs can include thread related APIs such as, but not limited to, thread creation APIs, thread pool APIs, locking APIs, synchronization APIs (e.g., mutexes, read/write locks, etc.), or the like. In one example, concurrency fuzzing module 434 can be associated singly with APIs as described in FIG. 2 or in a chained manner with various dynamic checks as described in FIG. 3.

When one of the hooked APIs is called by application 410, the call is redirected to concurrency fuzzing module 434. The redirection enables concurrency fuzzing module 434 to gain control over threads 412 to implement priority-based scheduling independent of scheduling mechanisms provided by operating system 450. According to an embodiment, concurrency fuzzing module 434 maintains a priority of each of threads 412, wherein a lower valued priority (e.g., lower number) indicates a lower priority.

In one embodiment, concurrency fuzzing module 434 schedules a low priority thread only when all higher priority threads are blocked (e.g., waiting for a resource). Accordingly, in this embodiment, a single thread is scheduled and executed at a given time. Concurrency fuzzing module 434 establishes priority change points, which can alter a priority of a thread. Each priority change point has a predetermined priority associated therewith. When execution of a thread reaches a priority change point, concurrency fuzzing module 434 changes the priority of the thread to the priority associated with the change point. Concurrency fuzzing module 434 subsequently schedules threads in accordance with the updated priorities.

In an illustrative and non-limiting example, concurrency fuzzing module 434 can implement the following procedure for a given program having n threads and k steps to facilitate identification of a bug associated with a depth d. Concurrency fuzzing module 434 can assign n priority values, ranging in value from d to d+n, at random to the n threads. Concurrency fuzzing module 434 can select d−1 random priority change points, $k_1, \ldots, k_{d-1}$, in the range $[1,k]$, where each $k_i$ has an associated priority value i. Concurrency fuzzing module 434 schedules the threads by honoring priorities. When a thread reaches the ith change point (e.g., executes the $k_i$th step), concurrency fuzzing module 434 changes the priority of the thread to i. Concurrency fuzzing module 434 subsequently changes the schedule to honor the changed priorities. Under the foregoing procedure, concurrency fuzzing module 434 can find a concurrency bug of depth d with a probability of at least $1/nk^{d-1}$. Additional details of the foregoing embodiment can be found in "A Randomized Scheduler with Probabilistic Guarantees of Finding Bugs," Sebastian Burckhardt, et al., ASPLOS'10, Mar. 13-17, 2010, which is incorporated herein by reference.

In another embodiment, concurrency fuzzing module 434 can implement an alternative priority-based scheduling mechanism. For instance, concurrently fuzzing module 434, in contrast to the previous embodiment, can schedule or execute more than one thread to ensure performance of application 410 even during testing. Concurrency fuzzing module 434 can schedule all threads, all threads minus one, all threads minus two, and so on. When scheduling threads, concurrency fuzzing module 434 can honor priorities randomly assigned to threads 412. For instance, threads having higher priorities can be scheduled such that the higher priority threads, over time, execute more instructions than threads having lower priorities. Accordingly, concurrency fuzzing module 434 slows rather than stops threads with low priorities. Further, concurrency fuzzing module 434 can randomly select priority change points that, when encountered by threads, change priorities. Thus, during execution, thread priorities randomly shift to enable more efficient discovery of subtle bugs by the set of monitors 432.

Figure 6:
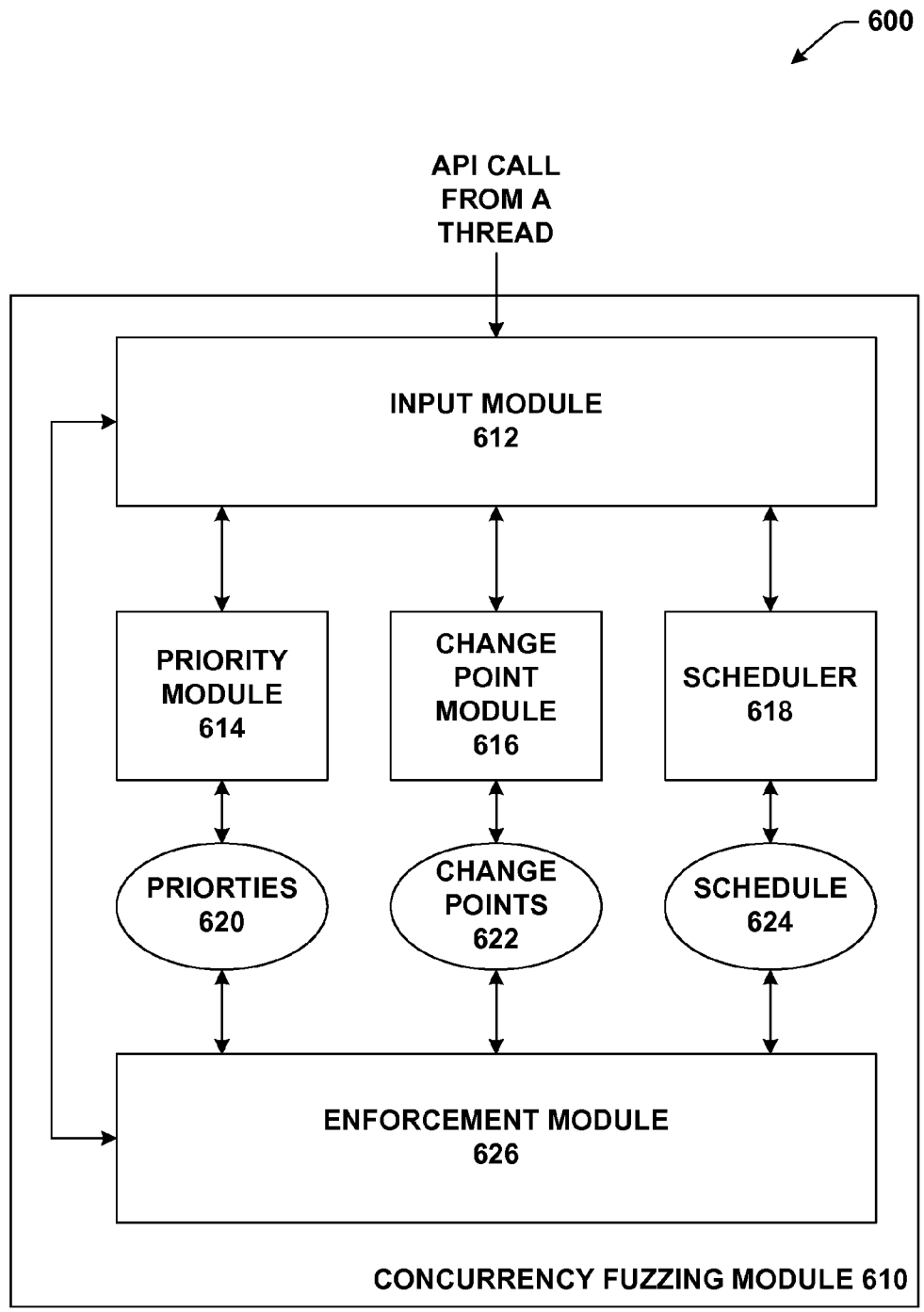
FIG. 6 is a block diagram of an exemplary concurrency fuzzing module in accordance with one or more embodiment.

With reference to FIG. 6, a block diagram 600 is provided that illustrates an exemplary concurrency fuzzing module 610. As shown in FIG. 6, concurrency fuzzing module 610 can include an input module 612 and respective other modules 614-618 and parameters 620-624 for randomizing thread schedules in a disciplined manner to increase a likelihood of detecting concurrency bugs associated with particular thread schedules. Input module 612 obtains input from a concurrent application being tested, where the input, in an embodiment, can be a call, from a thread, to an API to which the concurrency fuzzing module 610 is hooked. The input is provided to a priority module 614, a change point module 616, and a scheduler 618. Priority module 614 assigns a random priority to the thread (and other threads) and maintains the assigned priority in priorities 620. Change point module 616 identifies points (e.g., instructions, steps, etc.) of the thread (and other threads) at which to establish a priority change point. In addition, change point module 616 assigns, at random, a priority to the priority change point. In an embodiment, the priorities assigned to priority change points are lower than priorities assigned to threads by priority module 614. Change point module 616 maintains a change points parameter 622 that specifies the priority change points and associated priorities. Scheduler 618 provides a thread schedule 624 based upon priorities 620. As further shown in FIG. 6, concurrency fuzzing module 610 includes an enforcement module 626 configured to ensure threads of an application adhere to schedule 624. For instance, input module 612 intercepts an API call from a thread, enforcement module 626 can identify a priority associated with the thread and determine whether to delay the thread in order to implement schedule 624. In a non-limiting and illustrative example, the various modules and parameters 612-626 can coordinate to implement the priority-based thread scheduling of other embodiments described above.

Figure 7:
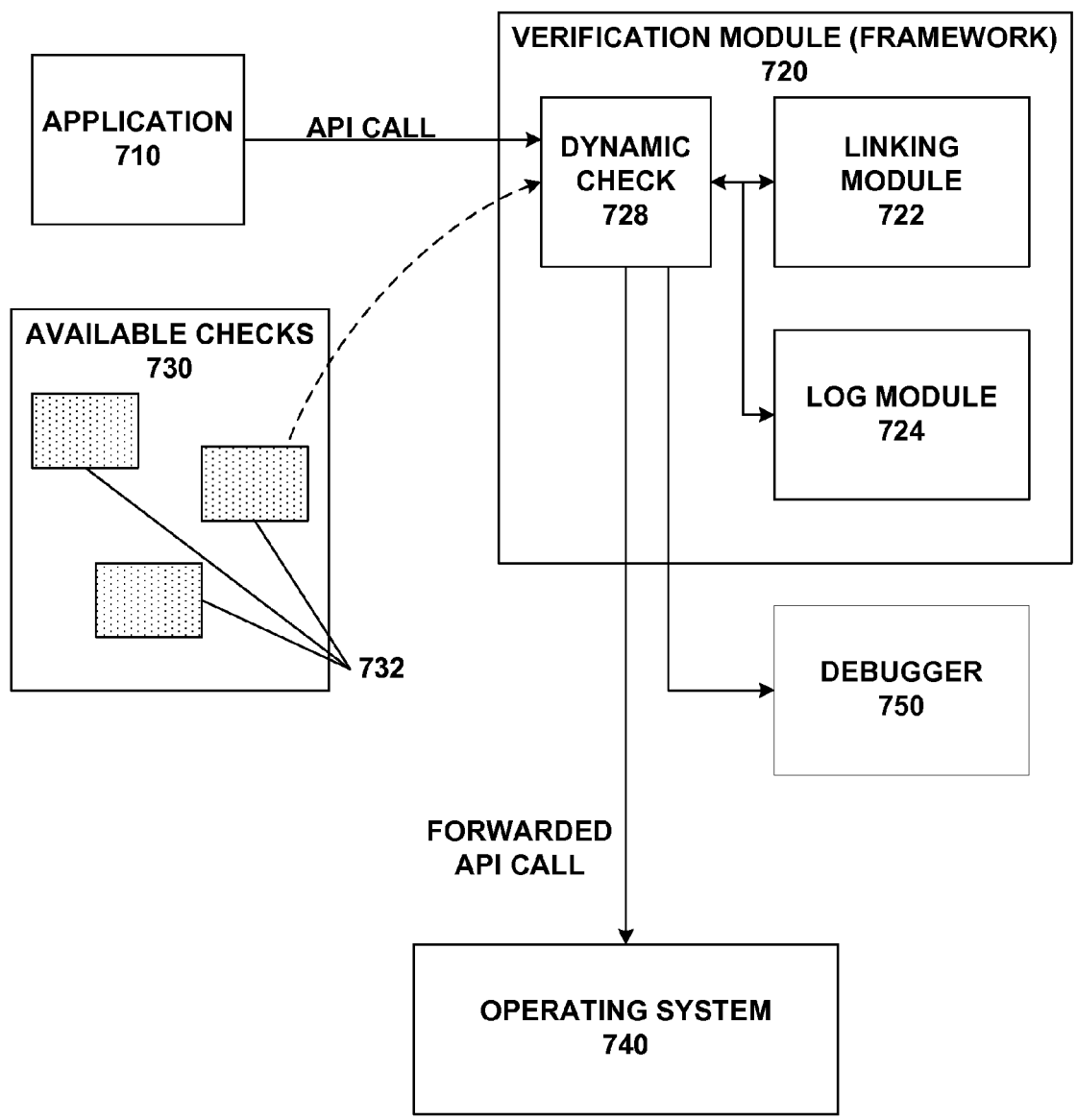
FIG. 7 is a block diagram of an exemplary verification framework in accordance with one or more embodiments.

With further regard to the above embodiments, FIG. 7 provides an illustrative overview of respective operations that can be performed by a verification module (framework) 720 in regard to an application 710. In an embodiment, verification module 720 provides an extensible framework that operates to enable dynamic and customizable testing of application 710 during runtime. For instance, a linking module 722 can dynamically activate or load testing modules such as dynamic check 728. As shown in FIG. 7, verification module 720 can draw upon a collection of available checks 730 to extend and customize a testing environment. The collection of available checks 730 can include dynamic checks 732 respectively configured to monitor memory management, memory usage, lock usage, handle usage, file system operations, critical section usage, thread usage, thread synchronization, or the like.

In one example, verification module 720 can load a dynamic check 732 from the collection of available checks 730 and instantiate the check in the framework as dynamic check 728. Linking module 722 can associate dynamic check 728 with application 710 via API hooking. For instance, linking module 722 can modify an import address table of application 710 such that one or more APIs employed by application 710 redirect to dynamic check 728. Through redirection of API calls, dynamic check 728 can gather information on application 710, verify parameters and inputs, and/or modify system calls to effectively detect programming errors.

Figure 8:
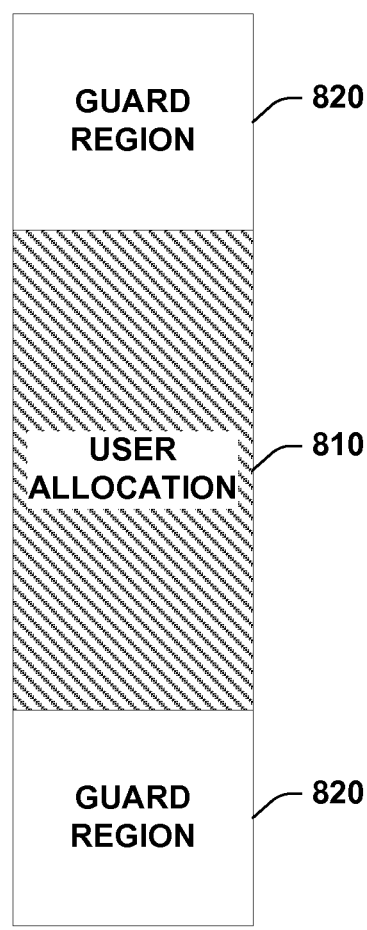
FIG. 8 is an illustrative view of an example technique employed by a dynamic check in accordance with one or more embodiments.

With reference to FIG. 8, one illustrative and non-limiting example of a dynamic check is provided. According to this example, a memory allocation system call can be intercepted by a dynamic check, such as dynamic check 728. Dynamic check 728 can modify the memory allocation request prior to forwarding the request to an operating system 740. In an aspect, the modification can facilitate instant detection of buffer overruns and/or underruns. FIG. 8 depicts a portion of memory having a user allocation portion 810 specified in the original memory allocation request. Dynamic check 728, when intercepting the request, can create guard regions 820 before and/or after user allocation portion 810. Dynamic check 728 configures guard regions 820 as no access pages of memory such that attempts to access addresses within guard regions 820 generate access violations. Accordingly, buffer overrun and/or buffer underrrun errors are caught at the point of failure.

In another example, dynamic check 728, upon intercepting a memory free operation, can block subsequent allocations within the freed memory space for a predetermined period time after the freeing operation. In this way, dynamic check 728 can facilitate identification of programming errors that can potentially result in heap corruptions. For instance, application 710, or a thread thereof, can allocate a portion of memory. Subsequently, application 710 can free the portion of memory. A future access or operation on the portion of memory can result in a heap corruption or undesired application behavior. Accordingly, dynamic check 728 can detect errors caused when application 710 frees memory and accesses freed memory.

The above examples are non-limiting illustrations of a few types of checks implemented by dynamic check 728 and/or checks 732 and it is to be appreciated that a variety of dynamic checks and tests can be applied to application 710 during runtime. In addition, it is to be appreciated that a programmer can develop new dynamic checks, which can be plugged into verification module 720. For instance, application 710 can include specific features for which a new dynamic check can test more effectively than existing checks. Verification module 720 provides an extensible framework to enable the new dynamic checks to be developed and loaded. For instance, the new dynamic checks can indicate APIs to be hooked by the linking module 722. Thereafter, the new dynamic checks interact with application 710 like existing checks.

In a further embodiment, dynamic check 728 collects information regarding application 710 during execution. The information can be written to a log file by log module 724. In a non-limiting example, the information can include verification stop events, parameter values, memory address, dump files information, stack traces, call stacks, or the like. In another embodiment, upon detection of an error, dynamic check 728 can halt application 710 and launch debugger 750 to facilitate debugging by a programmer. For instance, for a buffer overrun check as described above, dynamic check 728 can break into debugger 750 at a point in application 710 where the access violation is attempted.

Figure 9:
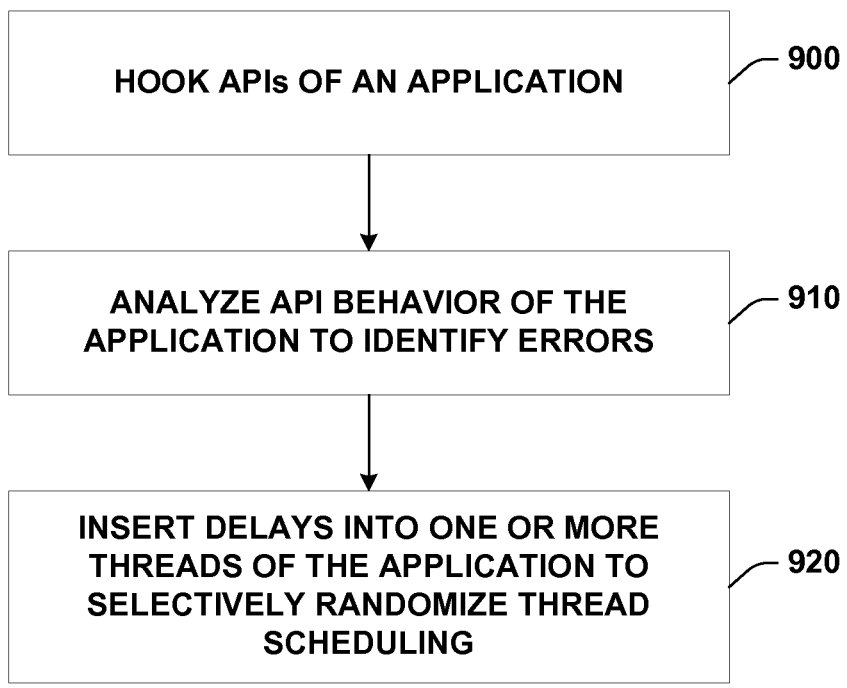
FIG. 9 is a flow diagram illustrating an exemplary non-limiting process for testing an application at runtime.

FIG. 9 is a flow diagram illustrating an exemplary non-limiting process for dynamically testing an application. At 900, APIs of an application are hooked. In one embodiment, hooking APIs can involve modifying entries, associated with the APIs, of an import address table of the application. At 910, API behavior of the application is analyzed to identify errors. At 920, delays are inserted into one or more threads of the application to randomize thread scheduling. In an embodiment, randomizing thread schedules maximizes a likelihood of discovering errors by analyzing API behavior.

Exemplary Networked and Distributed Environments

One of ordinary skill in the art can appreciate that the various embodiments of application testing systems and methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 10:
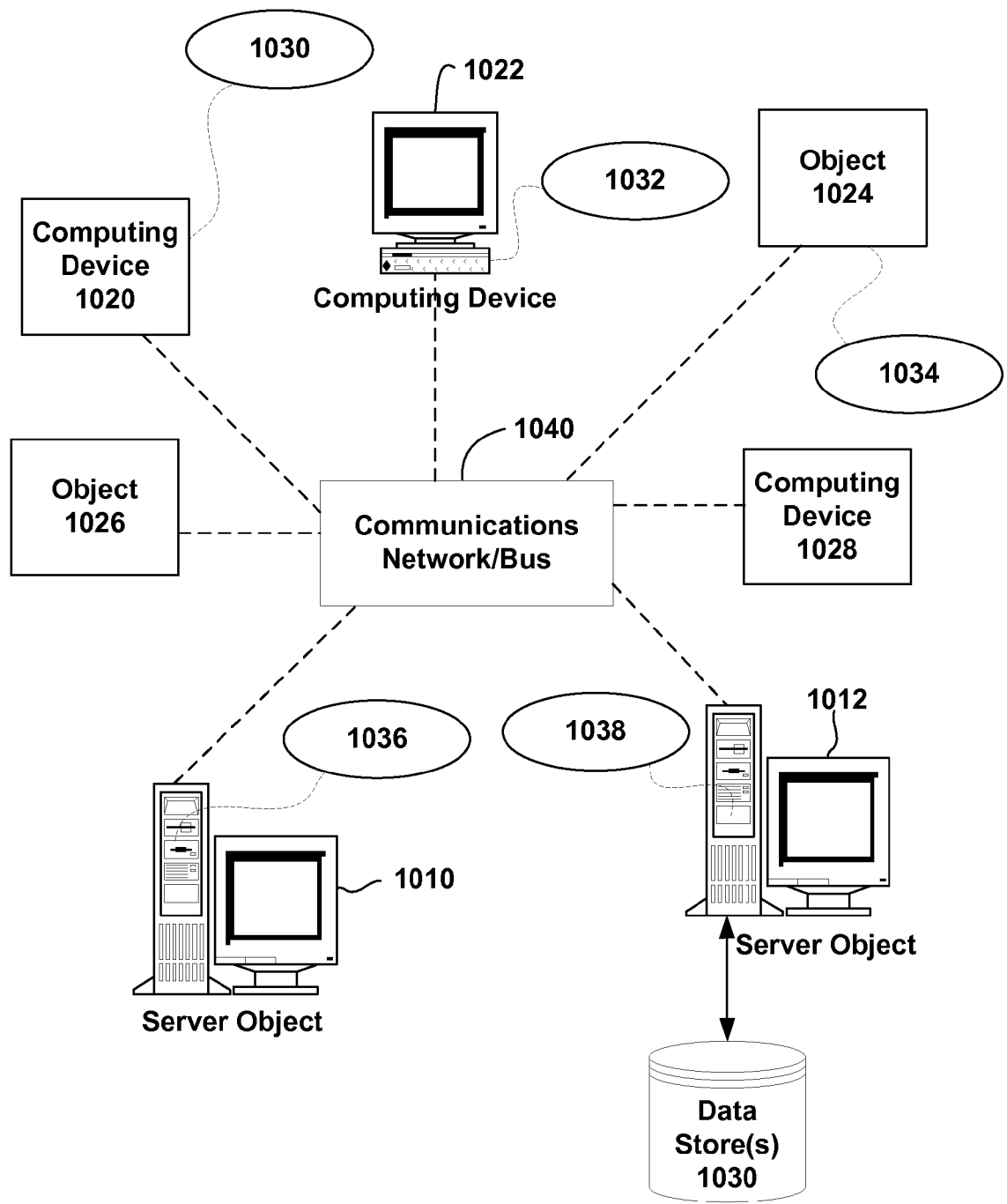
FIG. 10 is a block diagram representing exemplary non-limiting networked environments in which various embodiments described herein can be implemented.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038. It can be appreciated that computing objects 1010, 1012, etc.

and computing objects or devices 1020, 1022, 1024, 1026, 1028, etc. may comprise different devices, such as personal digital assistants (PDAs), audio/video devices, mobile phones, MP3 players, personal computers, laptops, etc.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1040, either directly or indirectly. Even though illustrated as a single element in FIG. 10, communications network 1040 may comprise other computing objects and computing devices that provide services to the system of FIG. 10, and/or may represent multiple interconnected networks, which are not shown. Each computing object 1010, 1012, etc. or computing object or device 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the application testing techniques provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc., acting as servers provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 1040 or bus is the Internet, for example, the computing objects 1010, 1012, etc. can be Web servers with which other computing objects or devices 1020, 1022, 1024, 1026, 1028, etc. communicate via any of a number of known protocols, such as the hypertext transfer protocol (HTTP). Computing objects 1010, 1012, etc. acting as servers may also serve as clients, e.g., computing objects or devices 1020, 1022, 1024, 1026, 1028, etc., as may be characteristic of a distributed computing environment.

Exemplary Computing Device

As mentioned, advantageously, the techniques described herein can be applied to any device where it is desirable to perform dynamically monitor and checks applications at runtime in a computing system. It can be understood, therefore, that handheld, portable and other computing devices and computing objects of all kinds are contemplated for use in connection with the various embodiments, i.e., anywhere that where applications are tested, monitored, and/or checked during execution. Accordingly, the below general purpose remote computer described below in FIG. 11 is but one example of a computing device.

Embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
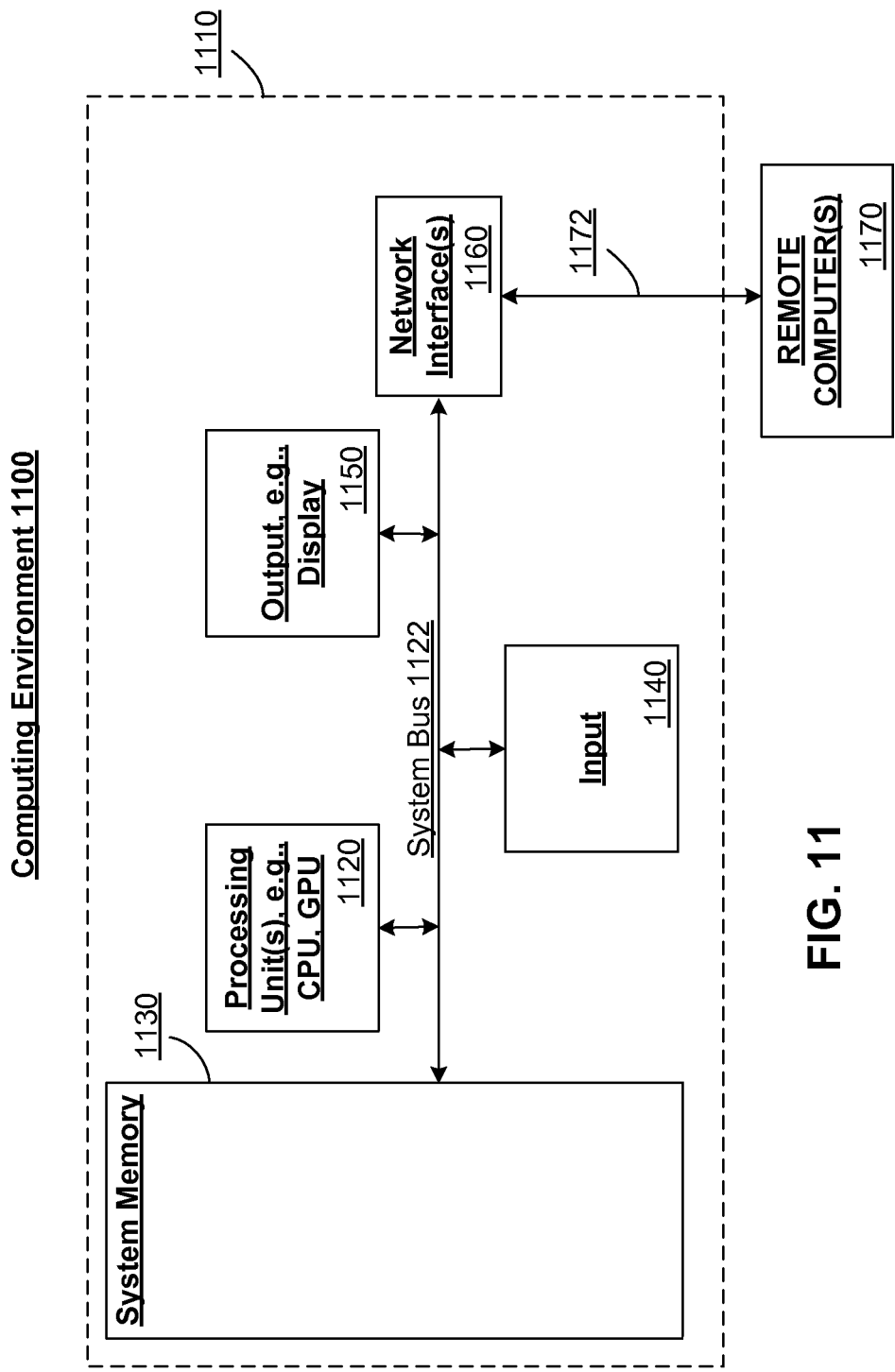
FIG. 11 is a block diagram representing an exemplary non-limiting computing system or operating environment in which one or more aspects of various embodiments described herein can be implemented.

FIG. 11 thus illustrates an example of a suitable computing system environment 1100 in which one or aspects of the embodiments described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the exemplary computing system environment 1100.

With reference to FIG. 11, an exemplary remote device for implementing one or more embodiments includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of computer readable media and can be any available media that can be accessed by computer 1110. The system memory 1130 may include computer storage media in the form of volatile and/or nonvolatile memory such as read only memory (ROM) and/or random access memory (RAM). By way of example, and not limitation, system memory 1130 may also include an operating system, application programs, other program modules, and program data.

A user can enter commands and information into the computer 1110 through input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A system, comprising:
a memory coupled to a bus system, wherein the memory comprises computer useable program code;
one or more processing units, wherein the one or more processing units execute the computer useable program code to provide for: one or more dynamic monitors respectively configured to detect program errors of an application during runtime, further comprising an engine module configured to associate the one or more dynamic monitors with the application, wherein the engine module is further configured to hook APIs employed by the application by modifying an import address table of the application to redirect API calls to the one or more dynamic monitors and to chain two or more dynamic monitors from a single API; and
a concurrency fuzzing module configured to selectively randomize a thread schedule associated with the application, wherein the one or more dynamic monitors to check the application in a variety of concurrency scenarios due to the randomized thread schedule and the concurrency fuzzing module randomizes the thread schedule to increase a likelihood of the one or more dynamic monitors detecting program errors.

2. The system of claim 1, wherein the one or more dynamic monitors include at least one of a memory monitor, a handle monitor, a thread pool monitor, a synchronization monitor, a locks monitor, a critical section monitor, an I/0 monitor, a print monitor, an exceptions monitor, a networking monitor, a low resource simulation monitor, a thread local storage monitor, an application hang monitor, a remote procedure call monitor, a component object model monitor, a service control manager monitor, or an application compatibility monitor.

3. The system of claim 1, wherein the one or more dynamic monitors are respectively further configured to intercept API calls of the application.

4. The system of claim 3, wherein the one or more dynamic monitors are further configured to collect information regarding a state of the application from intercepted API calls.

5. The system of claim 3, wherein the one or more dynamic monitors are further configured to forward API calls to an operating system, wherein forwarded API calls comprise modified versions of API calls from the application.

6. The system of claim 1, further comprising:
a verification framework configured to provide an extensible environment to dynamically monitor executing applications, wherein the verification framework dynamically loads the one or more dynamic monitors and the concurrency fuzzing module.

7. The system of claim 1, further comprising a log module configured to retain information generated by the one or more dynamic monitors.

8. The system of claim 1, wherein the one or more dynamic monitors are further configured to launch a debugger upon detection of a program error.

9. The system of claim 1, wherein the concurrency fuzzing module is further configured to hook APIs employed by the application, wherein the APIs are thread-related.

10. The system of claim 1, wherein the concurrency fuzzing module is further configured to insert delays in one or more threads associated with the application to randomize the thread schedule.

11. The system of claim 1, wherein the concurrency fuzzing module is further configured to assign initial priorities to one or more threads associated with the application, and to select priority change points in the application, wherein each priority change point is respectively associated with a priority value.

12. The system of claim 1, wherein the concurrency fuzzing module is further configured to schedule one or more threads of the application to run at a particular time.

13. A computer-implemented method
performed on at least one processor, comprising: intercepting calls, by an application, to a set of APIs, including modifying entries of an import address table of the application to redirect the set of APIs to one or more dynamic monitors;

analyzing API utilization of the application to identify errors of the application including analyzing the set of APIs; and inserting delays into one or more threads of the application to selectively randomize thread schedules.

14. A system, comprising:
a memory coupled to a bus system, wherein the memory comprises computer useable program code;

one or more processing units wherein the one or more processing units execute the computer useable program code to provide for: a verification framework configured to attach to an application during runtime, the verification framework loads at least one dynamic check from a set of available checks and a concurrency fuzzing module, wherein the verification framework associates at least one dynamic check and the concurrency fuzzing module with one or more APIs of an operating system employed by the application, at least one dynamic check analyzes behavior of the application via APIs calls to identify errors, and the concurrency fuzzing module inserts delays into one or more threads of the application to randomize an order in which instructions of one or more threads are executed.

15. The system of claim 14, wherein at least one dynamic check and the concurrency fuzzing module are further configured to avoid utilizing APIs of the operating system.

16. The system of claim 14, wherein the concurrency fuzzing module is further configured to implement priority-based thread scheduling independent of scheduling mechanisms provided by the operating system.

* * * * *